(12) United States Patent
Kim

(10) Patent No.: US 7,077,055 B2
(45) Date of Patent: Jul. 18, 2006

(54) STEAMING DEVICE FOR OVEN

(76) Inventor: Sung-Gon Kim, 945-1, Wonguk-dong, Ansan-si, Kyunggi-do (KR) 425-850

( * ) Notice: Subject to any disclaimer, the term of this patent is extended or adjusted under 35 U.S.C. 154(b) by 100 days.

(21) Appl. No.: 10/498,424

(22) PCT Filed: Dec. 9, 2002

(86) PCT No.: PCT/KR02/02317

§ 371 (c)(1),
(2), (4) Date: Jun. 11, 2004

(87) PCT Pub. No.: WO03/049584

PCT Pub. Date: Jun. 19, 2003

(65) Prior Publication Data

US 2005/0076794 A1    Apr. 14, 2005

(30) Foreign Application Priority Data

Dec. 12, 2001 (KR) .................... 10-2001-0078630

(51) Int. Cl.
*A47J 27/16* (2006.01)
(52) U.S. Cl. .................... 99/330; 99/403; 99/417; 219/401
(58) Field of Classification Search .......... 99/327–333, 99/326, 337, 338, 340, 339, 344, 347, 534, 99/401, 516, 444–450, 451, 536, 417, 403; 219/400, 401; 126/20, 20.1, 21 R, 21 A
See application file for complete search history.

(56) References Cited

U.S. PATENT DOCUMENTS

| 4,132,878 A | * | 1/1979 | Tachikawa et al. ......... 219/710 |
| 4,238,447 A | * | 12/1980 | Wolff .......................... 422/26 |
| 4,263,258 A | * | 4/1981 | Kalasek ..................... 422/113 |
| 4,395,383 A | * | 7/1983 | Kackos ...................... 422/112 |
| 4,403,128 A | * | 9/1983 | Takagi et al. ............... 219/757 |
| 4,426,923 A | * | 1/1984 | Ohata ......................... 99/468 |
| 4,506,598 A | * | 3/1985 | Meister ...................... 99/330 |
| 4,587,393 A | * | 5/1986 | Ueda .......................... 219/707 |

* cited by examiner

*Primary Examiner*—Timothy F. Simone
(74) *Attorney, Agent, or Firm*—Chapman and Cutler LLP

(57) ABSTRACT

A steaming device for an oven including a water supply unit for supplying drinking water, a boiler chamber for heating the drinking water supplied from the water supply unit while performing a secondary heating operation for heating steam flowing through a main steam supply pipe extending through at least one of through holes provided at a heat exchanger installed in the boiler chamber, thereby generating and supplying steam of a higher temperature, a cooking chamber for receiving the higher-temperature steam from the main steam supply pipe of the boiler chamber, thereby cooking food, a burner for heating the heat exchanger of the boiler chamber, and a control panel for controlling the burner. In accordance with this configuration, it is possible to supply steam of a high temperature, thereby achieving cooking of food such as steamed food, and to rapidly cook a large amount of food.

5 Claims, 5 Drawing Sheets

STEAMING DEVICE FOR OVEN

TECHNICAL FIELD

The present invention relates to a steaming device for an oven, and more particularly to a steaming device for an oven which is capable of generating steam of a high temperature, thereby cooking diverse foods.

BACKGROUND ART

Generally, cooking facilities using steam are installed in schools, army camps, and large-scale establishments in order to collectively provide meals.

For such cooking facilities, there have been known various facilities from a small-scale one capable of cooking food for 20 to 30 persons at one time to a large-scale one capable of cooking food for several hundred persons at one time.

However, such conventional cooking facilities using steam cannot obtain steam of 100° C. or more even in the case in which a complete thermal insulation is provided, so that they have a problem in that the efficiency of cooking is degraded.

In particular, such a limited temperature of steam causes an excessively prolonged cooking time. Furthermore, there is a problem in that cooking of particular food such as steamed food cannot be achieved.

On the other hand, in the case of a conventional large-scale cooking facility using steam, a considerable degradation in cooking efficiency occurs due to the limited steam temperature. In this case, waste of energy also occurs.

In addition, the conventional cooking facilities using steam have a drawback in that the taste of the cooked food is degraded due to the limited steam temperature, thereby causing the quality of the cooked food to be degraded. For this reason, users tend to avoid such cooking facilities using steam in accordance with a bias against those cooking facilities using steam.

DISCLOSURE OF THE INVENTION

Therefore, an object of the invention is to provide a steaming device for an oven which can supply steam of a high temperature, thereby achieving cooking of food such as steamed food.

Another object of the invention is to provide a steaming device for an oven which can obtain a maximum energy using efficiency to minimize the consumption of energy, thereby reducing expenses generated in accordance with the use thereof.

Another object of the invention is to provide a steaming device for an oven which can preserve the taste and smell of the food being cooked in an optimal state, thereby producing a cooked food product having a good quality.

Another object of the invention is to provide a steaming device for an oven which is inexpensive, to obtain excellent economic effects.

Another object of the invention is to provide a steaming device for an oven which can rapidly cook a large amount of food.

Another object of the invention is to provide a steaming device for an oven which can eliminate a consumer's bias against food cooked with steam.

These objects are accomplished by providing a steaming device for an oven comprising: a water supply unit for supplying drinking water; a boiler chamber for heating the drinking water supplied from the water supply unit while performing a secondary heating operation for heating steam flowing through a main steam supply pipe extending through at least one of through holes provided at a heat exchanger installed in the boiler chamber, thereby generating and supplying steam of a higher temperature; a cooking chamber for receiving the higher-temperature steam from the main steam supply pipe of the boiler chamber, thereby cooking food; a burner for heating the heat exchanger of the boiler chamber; and a control panel for controlling the burner.

BRIEF DESCRIPTION OF THE DRAWINGS

The above objects, and other features and advantages of the present invention will become more apparent after a reading of the following detailed description when taken in conjunction with the drawings, in which.

BEST MODE FOR CARRYING OUT THE INVENTION

Now, preferred embodiments of the present invention will be described in detail with reference to the annexed drawings.

Figure 1:
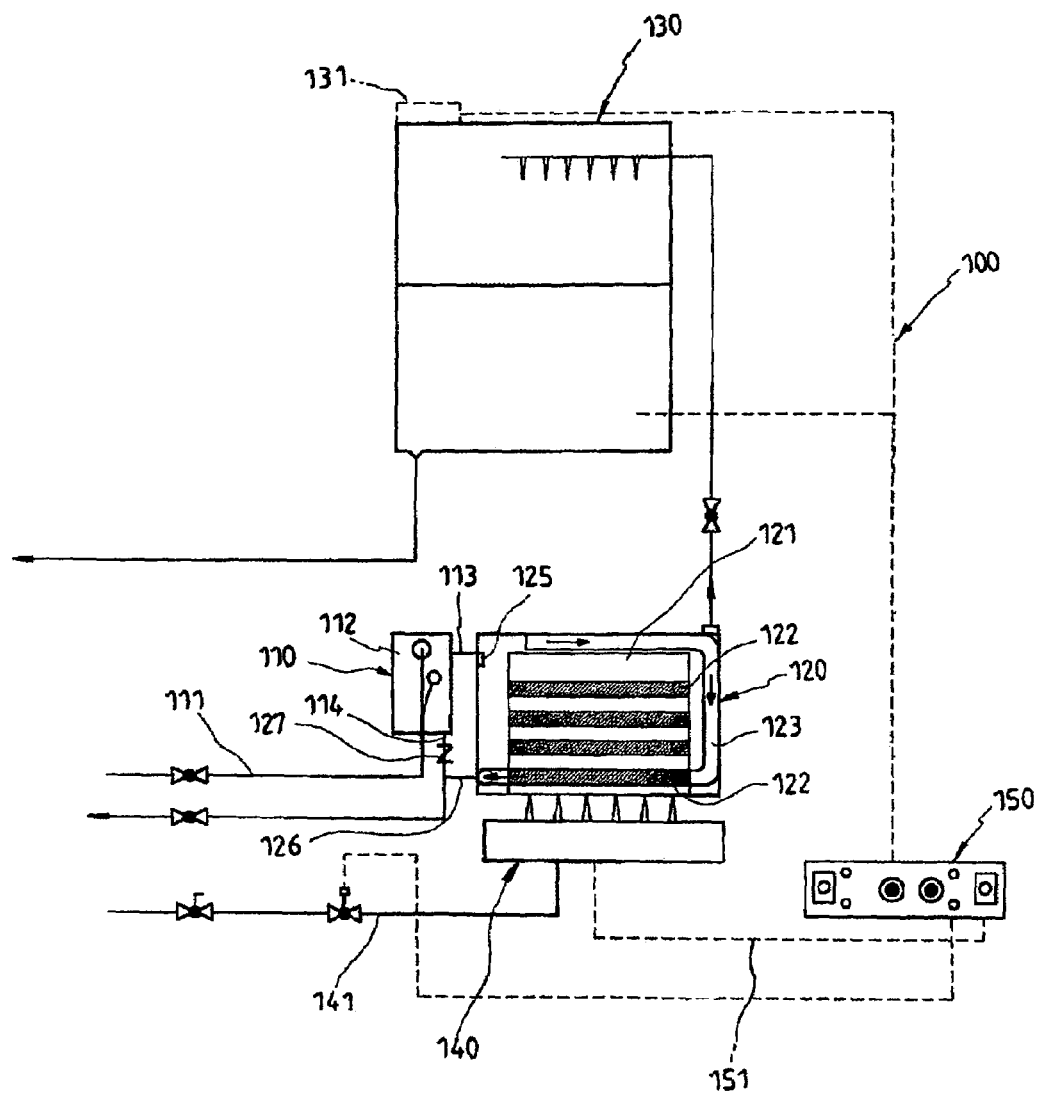
FIG. 1 is a schematic view illustrating the configuration of a steaming device for an oven according to an embodiment of the present invention.
Figure 2:
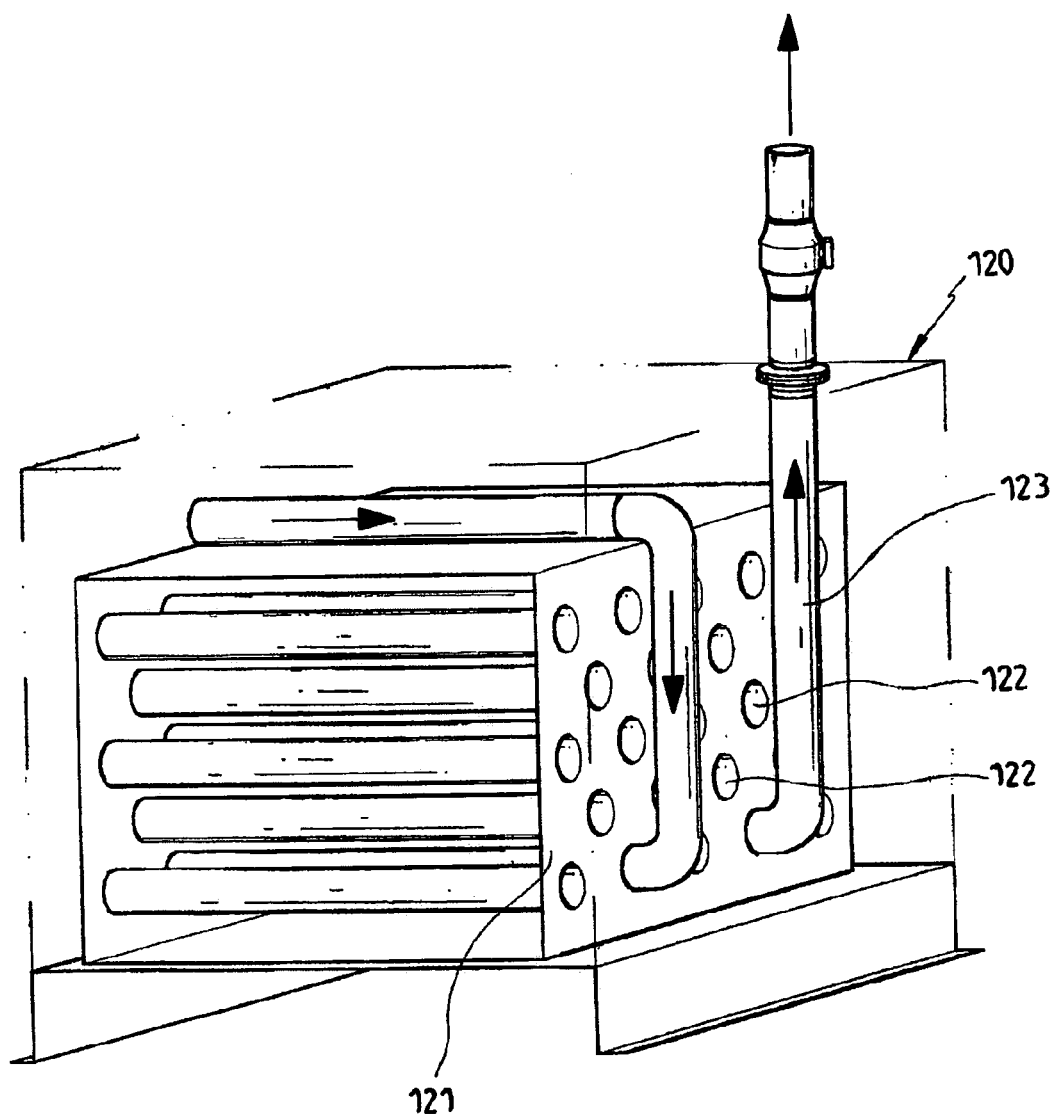
FIG. 2 is a perspective view illustrating a boiler part of the steaming device according to the embodiment of the present invention.
Figure 3:
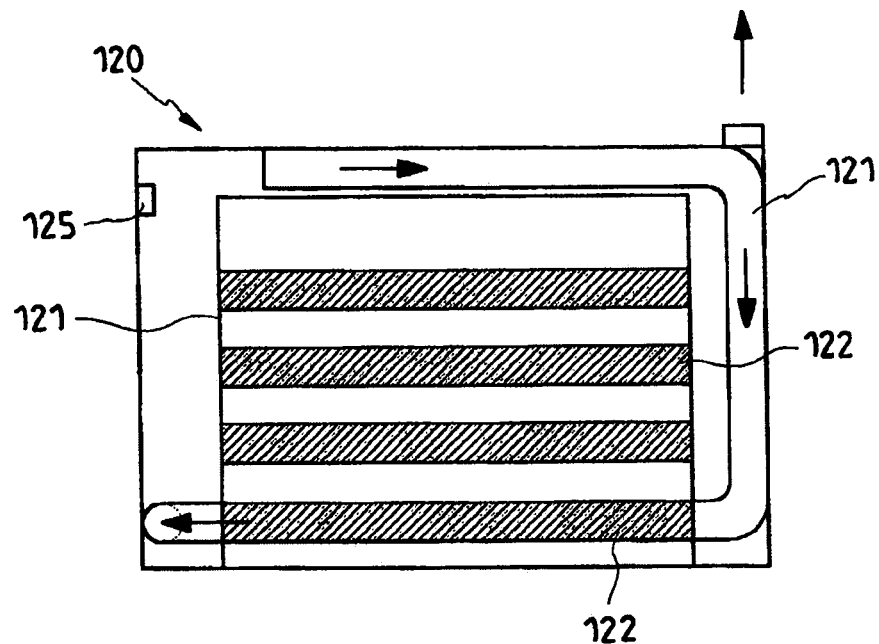
FIG. 3 is a front view illustrating the boiler part of the steaming device according to the embodiment of the present invention.
Figure 4:
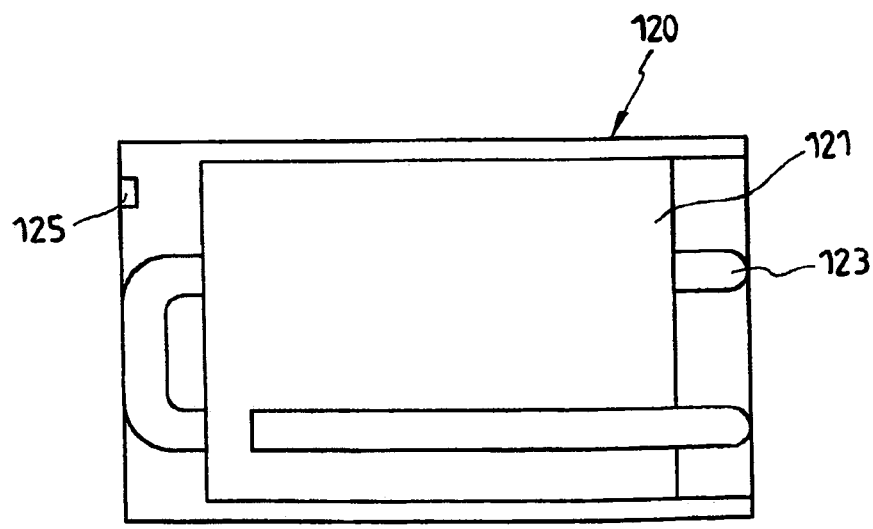
FIG. 4 is a plan view illustrating the boiler part of the steaming device according to the embodiment of the present invention.
Figure 5:
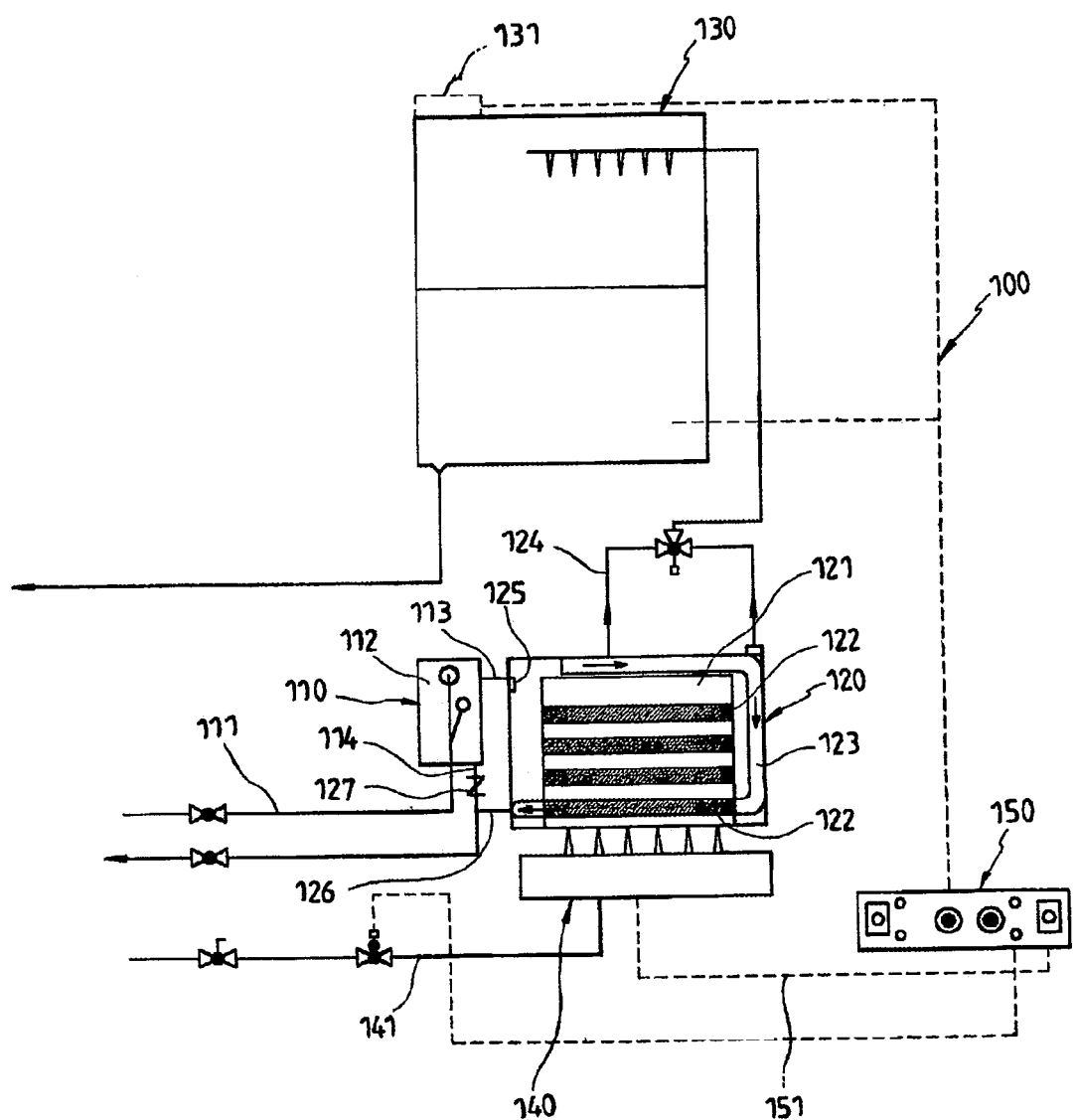
FIG. 5 is a schematic view illustrating the configuration of a steaming device for an oven according to another embodiment of the present invention.
Figure 6:
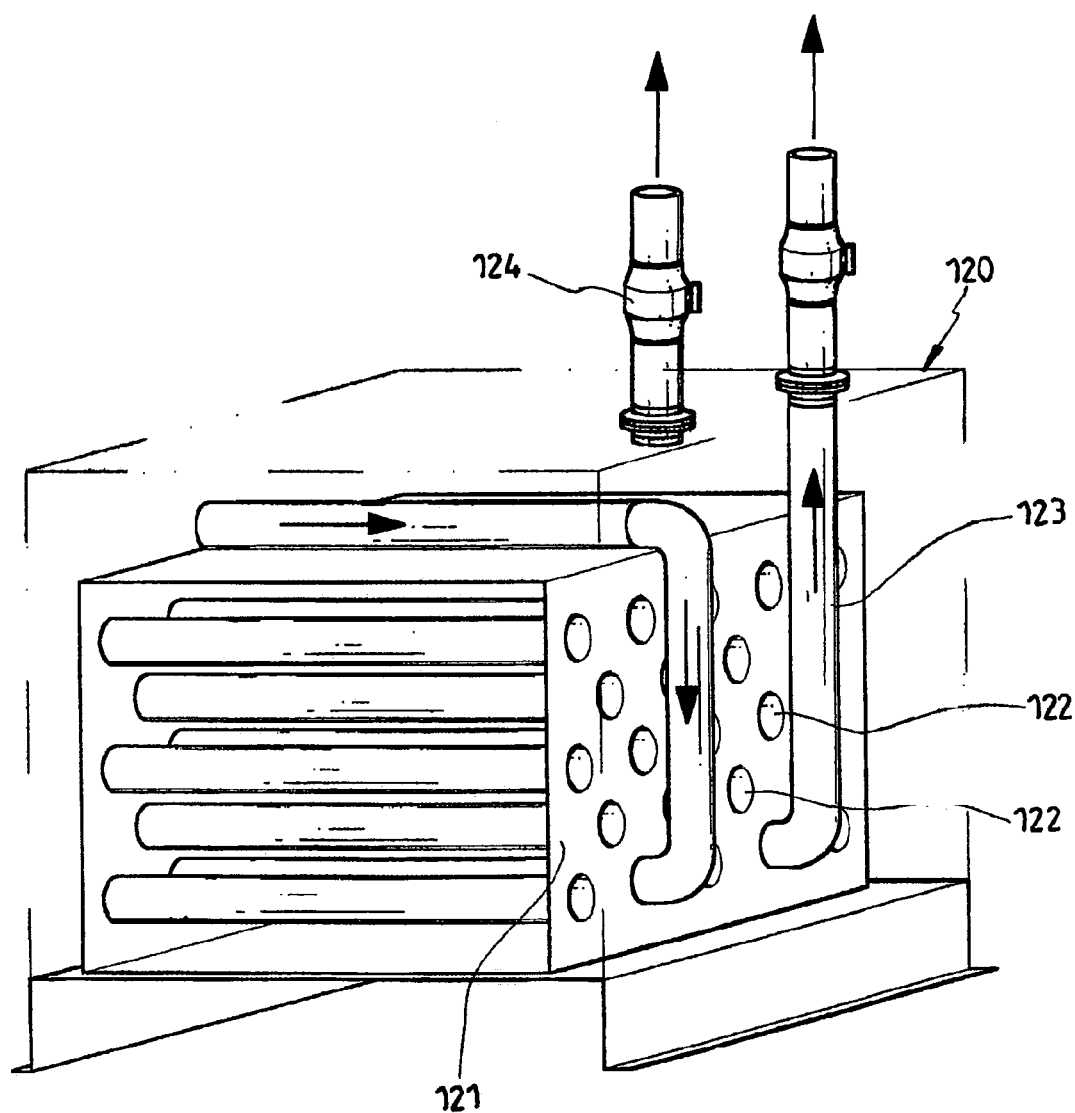
FIG. 6 is a perspective view illustrating a boiler part of the steaming device according to the another embodiment of the present invention.

FIG. 1 is a schematic view illustrating the configuration of a steaming device for an oven according to an embodiment of the present invention. FIG. 2 is a perspective view illustrating a boiler part of the steaming device. FIG. 3 is a front view illustrating the boiler part of the steaming device. FIG. 4 is a plan view illustrating the boiler part of the steaming device. FIG. 5 is a schematic view illustrating the configuration of a steaming device for an oven according to another embodiment of the present invention. FIG. 6 is a perspective view illustrating a boiler part of the steaming device according to the another embodiment of the present invention.

As shown in FIGS. 1 to 6, the steaming device, which is any one of the embodiments of the present invention, and is denoted by the reference numeral 100, basically includes a water supply unit 110 for supplying drinking water, and a boiler chamber 120 for heating the drinking water supplied from the water supply unit 110 while performing a secondary heating operation for heating steam flowing through a main steam supply pipe 123 extending through at least one of through holes 122 provided at a heat exchanger 121 installed in the boiler chamber 120, thereby generating and supplying steam of a higher temperature. The steaming device 100 also includes a cooking chamber 130 for receiving the hot steam from the main steam supply pipe 123 of the boiler chamber 120, thereby cooking food, a burner 140 for heating the heat exchanger 121 of the boiler chamber 120, and a control panel 150 for controlling the burner 140.

The water supply unit 110 includes an auxiliary tank 112, a water supply pipe 111 connected to the auxiliary tank 112 at one side of the auxiliary tank 112 to supply drinking water to the auxiliary tank 112, and a connecting pipe 113 connected between the auxiliary tank 112 and the boiler chamber 120 at the other side of the auxiliary tank 112 to supply the drinking water from the auxiliary tank 112 to the boiler chamber 120. A drain pipe 114 is connected to the bottom of the auxiliary tank 112 in order to externally drain the drinking water from the auxiliary tank 112 if desired.

A ball tap may be mounted in the auxiliary tank 112 in order to maintain the drinking water at a desired level in the auxiliary tank 112.

In the boiler chamber 120, the main steam supply pipe 123 extends, at an inlet end thereof, through a selected one of the through holes 122 provided at the heat exchanger 121 in such a fashion that the outer surface of the main steam supply pipe 123 is in close contact with the inner surface of the selected through hole 122. The inlet end of the main steam supply pipe 123, which is inserted into the interior of the boiler chamber 120, is positioned at the upper portion of the boiler chamber 120, whereas the outlet end of the main steam supply pipe 123 is communicated with the cooking chamber 130 to which hot steam is to be supplied. When the drinking water supplied to the interior of the boiler chamber 120 is heated, thereby generating steam, the generated steam is introduced into the main steam supply pipe 123 through the inlet end of the main steam supply pipe 123. The introduced steam is secondarily heated while passing through the heat exchanger 121 again along the main steam supply pipe 123. Thus, steam of a higher temperature is supplied to the cooking chamber 130.

In particular, the main steam supply pipe 123, which is an essential configuration of the present invention, is not limited, in terms of its structure, by the shape or size of the heat exchanger 121. That is, the main steam supply pipe 123 may have diverse structures irrespective of the shape or structure of the boiler in so far as it can feed again the initially generated steam to the heat exchanger 121 to secondarily heat the steam, thereby obtaining steam of a higher temperature.

The main steam supply pipe 123 may extend through a desired number of through holes 122 in the heat exchanger 121. Preferably, the main steam supply pipe 123 extends through one or two through holes in order to allow the drinking water to be effectively heated in the boiler chamber 120.

In order to allow only steam to be supplied into the main steam supply pipe 123, a level sensor 125 is installed in the boiler chamber 120 for controlling the level of the drinking water in the boiler chamber 120. By the level sensor 125, the drinking water in the boiler chamber 120 can be maintained at a desired level.

In accordance with another embodiment of the present invention, an auxiliary steam supply pipe 124 may be connected to the top of the boiler chamber 120 so that it is directly communicated with the boiler chamber 120, as shown in FIG. 6. The auxiliary steam supply pipe 124 serves to allow a selection of a desired steam temperature according to food to be cooked.

In this case, it is preferred that the main and auxiliary steam supply pipes 123 and 124 are connected to the cooking chamber 130 via a 3-way valve so that they selectively supply steam, as shown in FIG. 5.

A drain pipe 126 is connected to a lower portion of the boiler chamber 120 at one side of the boiler chamber 120. The drain pipe 126 may be communicated with the drain pipe 114 of the auxiliary tank 112. In this case, it is desirable to install a check valve 127 at the drain pipe 114 of the auxiliary tank 112, thereby preventing the heated drinking water from flowing backwards into the auxiliary tank 112.

The cooking chamber 130 may have diverse shapes and diverse steam injection structures while using diverse steam injection methods.

For example, the cooking chamber 130 may have a vertically or laterally divided structure, or a multi-stage structure. The supply of steam in the cooking chamber 130 may be carried out in an upward, downward, inward, or rearward direction, or in combined directions thereof.

Preferably, a temperature sensor 131 is installed in the cooking chamber 130 in order to set a cooking temperature according to the food to be cooked, and to control the cooking temperature at intervals of time.

For the burner 140, conventional burners may be used. However, it is preferable that the burner 140, suitably connected to burner fuel supply 141, comprises a burner configured to use flammable gas, taking into consideration generation of fumes and bad smell.

The control panel 150 is electrically connected to the burner 140 via an ignition line 151 to control the ignition, heat, and operating time of the burner 140 in accordance with a set cooking temperature and time. Thus, optimal cooking procedures can be carried out.

Now, the operation of the steaming device according to the present invention will be described.

Under the condition in which food to be cooked has been washed, and seasoned, appropriate amounts of the food are sequentially stacked in the cooking chamber 130. Thereafter, a desired steaming temperature and a desired steaming time are selected based on the food to be cooked, using the control panel 150. The burner 140 is then ignited.

As the burner 140 is ignited, the heat exchanger 121 is heated, thereby heating the drinking water in the boiler chamber 120.

When the drinking water in the boiler chamber 120 is completely boiled, steam is generated. This initial steam passes through the heat exchanger 121 again via the main steam supply pipe 123, so that it is secondarily heated. Thus, steam of a higher temperature is supplied to the cooking chamber 130.

Accordingly, it is possible to not only effectively achieve cooking of steamed food or the like, but also to rapidly cook any food.

Industrial Applicability

As apparent from the above description, the steaming device 100 for an oven according to the present invention has a configuration including the water supply unit 110 for supplying drinking water, the boiler chamber 120 for heating the drinking water supplied from the water supply unit 110 while performing a secondary heating operation for heating steam flowing through the main steam supply pipe 123 extending through at least one of the through holes 122 provided at the heat exchanger 121, thereby generating and supplying steam of a higher temperature, the cooking chamber 130 for receiving the hot steam from the main steam supply pipe 123 of the boiler chamber 120, thereby cooking food, the burner 140 for heating the heat exchanger 121 of the boiler chamber 120, and the control panel 150 for controlling the burner 140. In accordance with this configuration, it is possible to supply steam of a high temperature, thereby achieving cooking of food such as steamed food, to minimize the consumption of energy, thereby reducing expenses generated in accordance with the use thereof, to preserve the taste and smell of the food being cooked in an optimal state, thereby producing a cooked food product having a good quality, and to rapidly cook a large amount of food.

The invention claimed is:

1. A steaming device for an oven comprising:
   a water supply unit for supplying drinking water;
   a boiler chamber for heating the drinking water supplied from the water supply unit while performing a secondary heating operation for heating steam flowing through a main steam supply pipe extending through at least one of through holes provided at a heat exchanger installed in the boiler chamber, thereby generating and supplying steam of a higher temperature;
   a cooking chamber for receiving the higher-temperature steam from the main steam supply pipe of the boiler chamber, thereby cooking food;
   a burner for heating the heat exchanger of the boiler chamber; and
   a control panel for controlling the burner.

2. The steaming device according to claim 1, wherein the water supply unit comprises an auxiliary tank, a water supply pipe connected to the auxiliary tank at one side of the auxiliary tank to supply drinking water to the auxiliary tank, a connecting pipe connected between the auxiliary tank and the boiler chamber at the other side of the auxiliary tank to supply the drinking water from the auxiliary tank to the boiler chamber; and a drain pipe connected to the bottom of the auxiliary tank, and means for maintaining the drinking water at a desired level in the auxiliary tank.

3. The steaming device according to claim 1, wherein the main steam supply pipe extends, at an inlet end thereof, through the at least one of the through holes so that an outer surface of the main steam supply pipe is in close contact with an inner surface of the at least one of the through holes, and the inlet end of the main steam supply pipe is positioned at an upper portion of the boiler chamber, whereas an outlet end of the main steam supply pipe is communicated with the cooking chamber to which hot steam is to be supplied, so that the steam introduced into the main steam supply pipe through the inlet end of the main steam supply pipe is secondarily heated while passing through the heat exchanger again along the main steam supply pipe, thereby causing the cooking chamber to be supplied with steam of a higher temperature.

4. The steaming device according to claim 1, wherein the boiler chamber is provided with a level sensor for controlling a level of the drinking water in the boiler chamber so that the drinking water in the boiler chamber is maintained at a desired level for allowing only steam to be supplied into the main steam supply pipe.

5. The steaming device according to any one of claims 1, 3, and 4, further comprising:
   an auxiliary steam supply pipe connected to the top of the boiler chamber so that it is directly communicated with the boiler chamber.

* * * * *